(No Model.) 7 Sheets—Sheet 1.

W. B. JACKSON.
MACHINE FOR MAKING SPIRAL WIRE SPRINGS.

No. 502,968. Patented Aug. 8, 1893.

WITNESSES:
Donn Twitchell
C. Sedgwick

INVENTOR:
W. B. Jackson
BY Munn & Co.
ATTORNEYS (No Model.) 7 Sheets—Sheet 3.

W. B. JACKSON.
MACHINE FOR MAKING SPIRAL WIRE SPRINGS.

No. 502,968. Patented Aug. 8, 1893.

WITNESSES:
Donn Twitchell
C. Sedgwick

INVENTOR:
W. B. Jackson
BY Munn & Co
ATTORNEYS (No Model.) 7 Sheets—Sheet 5.
W. B. JACKSON.
MACHINE FOR MAKING SPIRAL WIRE SPRINGS.
No. 502,968. Patented Aug. 8, 1893.

WITNESSES:
Dorm Twitchell
Co. Sedgwick

INVENTOR:
W. B. Jackson
BY Munn & Co
ATTORNEYS (No Model.) 7 Sheets—Sheet 6.

W. B. JACKSON.
MACHINE FOR MAKING SPIRAL WIRE SPRINGS.

No. 502,968. Patented Aug. 8, 1893.

WITNESSES:
Donn Twitchell
C. Sedgwick

INVENTOR:
W. B. Jackson
BY Munn & Co.
ATTORNEYS

(No Model.) 7 Sheets—Sheet 7.

W. B. JACKSON.
MACHINE FOR MAKING SPIRAL WIRE SPRINGS.

No. 502,968. Patented Aug. 8, 1893.

WITNESSES:
Donn Twitchell
C. Sedgwick

INVENTOR:
W. B. Jackson
BY
Munn & Co.
ATTORNEYS

UNITED STATES PATENT OFFICE.

WILLIAM B. JACKSON, OF PORTLAND, OREGON.

MACHINE FOR MAKING SPIRAL WIRE SPRINGS.

SPECIFICATION forming part of Letters Patent No. 502,968, dated August 8, 1893.

Application filed May 24, 1892. Serial No. 434,185. (No model.)

*To all whom it may concern:*

Be it known that I, WILLIAM B. JACKSON, of Portland, in the county of Multnomah and State of Oregon, have invented a new and Improved Machine for Making Spiral Wire Springs, of which the following is a full, clear, and exact description.

The invention relates to machines for making spiral wire springs used for bed mattresses, upholstering, and other purposes.

The object of the invention is to provide a new and improved machine, arranged to automatically coil the wire into a double spiral, and to fasten the ends of the wire upon the end coils.

The invention also consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Fig. 18 is a face view of part of the main cam wheel, showing means for operating the knotting devices.

The improved machine for making spiral wire springs, is provided with a suitably constructed main frame A, on one end of which is journaled in suitable bearings, a main driving shaft B, carrying at one end a pulley B', connected by belt with suitable machinery for imparting a rotary motion to the said shaft B. On the latter, next to the pulley B', is secured a pinion $B^2$ in mesh with a large gear wheel C', formed at the rear face of a cam wheel C secured on a shaft $C^2$ extending transversely and mounted to turn in suitable bearings held in the main frame A.

The cam wheel C, has formed or secured on its inner side a segmental bevel gear wheel $C^3$, adapted to engage a beveled pinion D, mounted on a stud projecting from one end of the frame A. On the face of this beveled pinion D is secured or formed a gear wheel D' in mesh with a gear wheel $D^2$, mounted to revolve on a stud supported on a bracket attached to one end of the main frame A, as is plainly illustrated in Figs. 2 and 4. On the face of this gear wheel $D^2$ is secured a larger gear wheel $D^3$, in mesh with a pinion $D^4$ held on the hub of disk O, said hub being held on the mandrel shaft E by means of a key engaging a longitudinal slot in the said shaft E, so that the latter can slide longitudinally without disengaging the pinion $D^4$ and the gear wheel $D^3$. The mandrel shaft E extends longitudinally, and is held in suitable bearings supported from the frame F, as hereinafter more fully described. The said frame F is arranged within the main frame A, and supported on four or more screw shafts F' extending vertically and turning in nuts held or formed on lugs projecting from the legs of the main frame A. The lower ends of the screw shafts F', carry sprocket wheels $F^2$, over which passes an endless sprocket chain $F^3$, (See Figs. 4 and 5.) On one of the screw shafts F' is secured a hand wheel F⁴ adapted to be turned by the operator to raise or lower the frame F as desired. It is understood that when the operator turns this hand wheel F⁴, a similar rotary motion is imparted to all the screw shafts F', by the sprocket chain F³ engaging the sprocket wheels F² secured on the several screw shafts F'. By this means, the position of the frame F carrying the mandrel shaft and mandrel, can be adjusted vertically.

Figures 4, 19, 20:
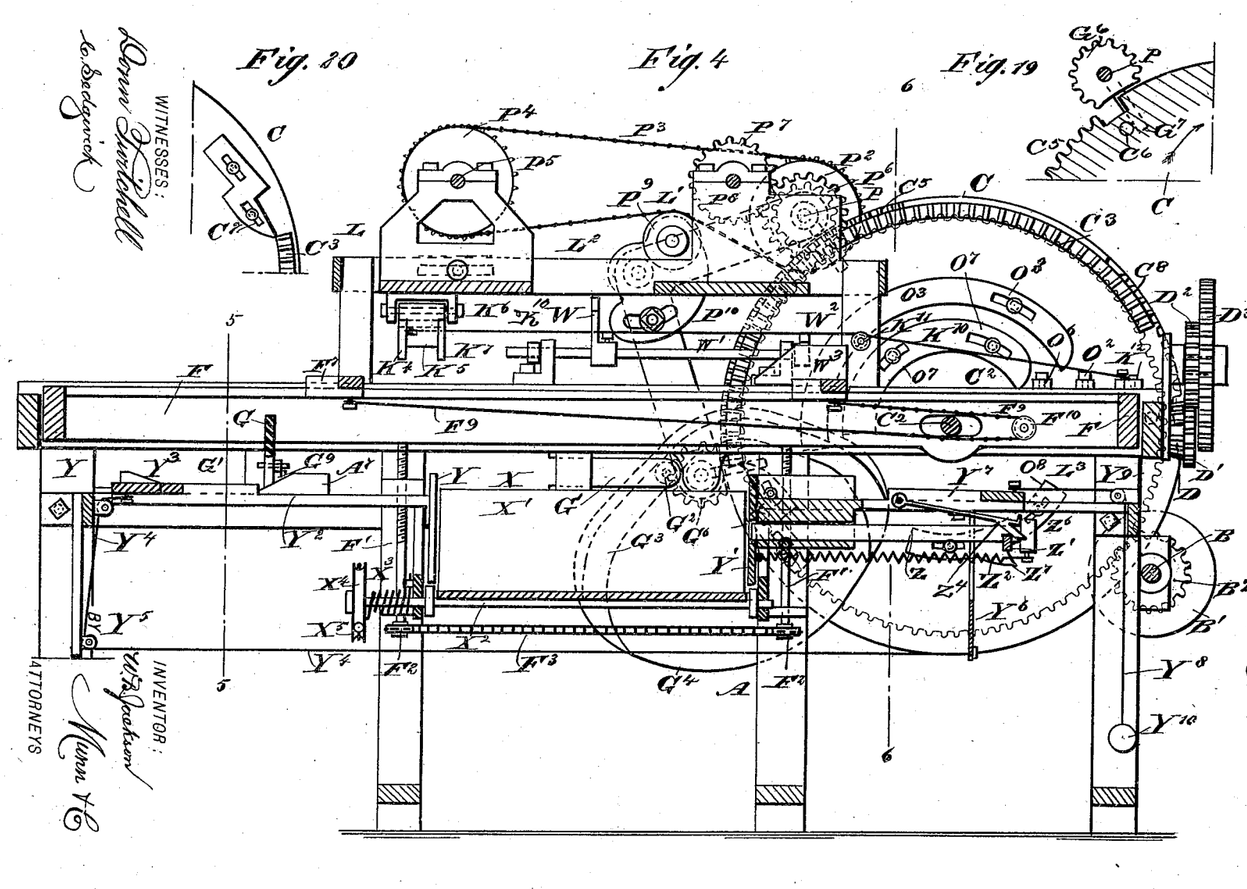
Fig. 4 is a sectional side elevation of the improvement on the line 4—4 of Fig. 2.
Fig. 19 is a sectional view of the cam wheel and mechanism for separating the spring forming cones.
Fig. 20 is a face view of part of the main cam wheel, showing projection for operating the lever connected with the mechanism for opening the spring band.

The mandrel is provided with two spring-forming cones E' and E², of which the former is secured on the shaft E, previously mentioned, and the other cone E² is secured on a shaft E³. The two shafts E³ and E, as well as the cones E' and E², are arranged in alignment with each other, the two cones E' and E² being adapted to abut on one another at their small ends, as is plainly indicated in Figs. 10, 11 and 13. On the cones E' and E² are formed the spiral grooves E⁴ and E⁵ which, when the cones abut on one another, form a continuous spiral groove for the reception of the wire forming the spring. On the small end of the cone E² is secured a square lug E⁶, adapted to project into a correspondingly shaped recess formed centrally in the small end of the other cone E'. Thus, when the shaft E is rotated, its cone E' rotates with it, and by engaging the square lug E⁶ rotates the cone E² and its shaft E³. When the machine is in motion, the spring-forming cones E' and E² receive an intermittent rotary motion, it being understood that on each revolution of the cam wheel C, the segmental gear wheel C³ engages, during part of the revolution, the bevel gear wheel D, so that the latter is rotated a number of times during part of the revolution of the cam wheel C and remains stationary during the remainder of that one revolution of the cam wheel C. The rotary motion of the bevel gear wheel D is transmitted by the intermediate gear wheels D', D², D³, and a pinion D⁴ to the shaft E, which latter rotates the spring-forming cones E' and E², as above described. The shaft E is mounted to revolve, near its outer end, in a hub D⁵ formed on the disk O, the said hub being mounted to revolve in a bearing F⁵ secured at this end of the frame F. The inner end of the shaft E, adjacent to the cone E', is mounted to revolve in a bearing held or formed in a bracket F⁶ extending transversely and mounted to slide longitudinally on the frame F. The other shaft E³ for the cone E² is mounted to revolve, at its inner end, in a bearing formed in a bracket F⁷, similar to the bracket F⁶, and also mounted to slide longitudinally on the frame F. The two brackets F⁷ and F⁶, are connected with each other by means of a sprocket chain F⁹, which extends longitudinally on one side of the frame F and passes over a pulley F¹⁰ supported from the said side of the frame F, see Fig. 1. A like connection is made between the brackets F⁶ and F⁷, as shown in Fig. 4, and in opposite direction to the other connection, so that the brackets move simultaneously toward or from each other as hereinafter more fully described. The outer end of the shaft E³ is mounted to turn in a suitable bearing F⁸ supported at the left end of the frame F. The large ends of the cones E' and E², abut against one side of the brackets F⁶ and F⁷ respectively, while on the outer sides of the said brackets, abut collars secured to the shafts E and E³, so that when the brackets F⁶ and F⁷ are caused to slide longitudinally, the shafts E and E³ and their cones E' and E² respectively, move with the said brackets.

In order to impart a sliding motion to the cones E' and E² so as to separate the same for the purpose of removing the spring, as hereinafter more fully described, the following device is provided: On the shaft E³, next to the bracket F⁷, are secured the two collars E⁷ and E⁸, placed a suitable distance apart, and between which operates an arm G projecting transversely from a bar G', mounted to slide in suitable bearings on the rear side of the main frame A. On the right-hand end of the bar G' is held a friction roller G² see Figs. 1, 2, 4 and 5 engaging a cam groove G³ formed on a cam wheel G⁴ mounted to revolve loosely on a stud G⁵, (see Fig. 2) projecting laterally from the rear side of the main frame A. The friction roller G² is adapted to travel, during a part of each revolution of the cam wheel G⁴, through the cam grooves G³ and also during the remainder of the revolution on the periphery of the said cam. On the hub of the cam wheel G⁴ is secured or formed a gear wheel G⁶ adapted to mesh in a segmental gear wheel C⁵, formed in the rim of the cam wheel C. The rim is provided with a pin C⁶ (see Fig. 19) adapted to engage an arm G⁷ attached to the face of the gear wheel G⁶, which latter is formed in its rim with a recess corresponding to the periphery of the rim of the cam wheel C. Thus, when the cam wheel C rotates, as previously described, the smooth part of the rim passes through the recess in the rim of the wheel G⁶, so that the latter remains stationary.

Figures 5, 6, 8, 9:
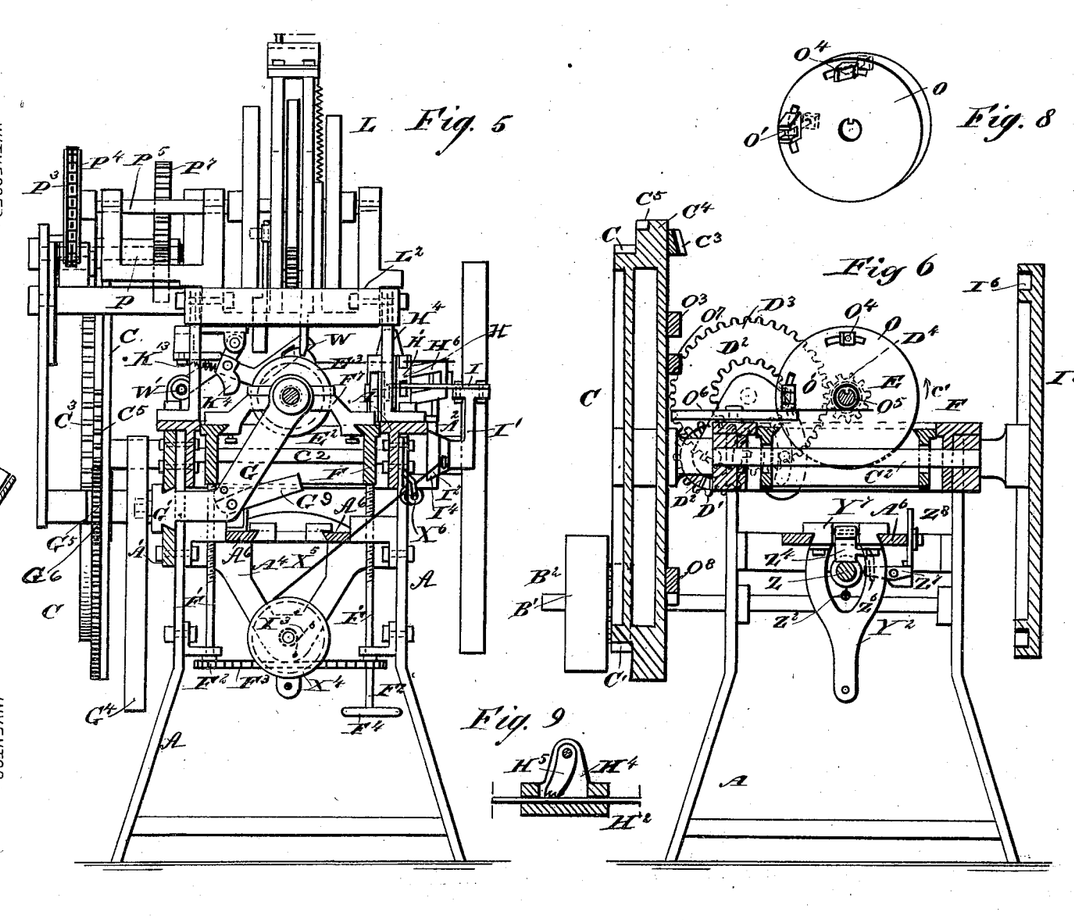
Fig. 5 is a transverse section of the improvement on the lines 5—5 of Figs. 2 and 4.
Fig. 6 is a similar view of the same on the lines 6—6 of Figs. 2 and 4.
Fig. 8 is a perspective view of the locking disk on main cone shaft.
Fig. 9 is a sectional side elevation of the lock for the wire feeding device.

In order to engage the segmental gear wheel C⁵ with the gear wheel G⁶, the latter has to be turned a short distance until the teeth of the segmental gear wheel C⁵ mesh with the teeth of the gear wheel G⁶. This is done by the pin C⁶ striking the arm G⁷, so that the gear wheel G⁶ is slightly turned and its teeth engage the teeth of the segmental gear wheel C⁵. Thus an intermittent rotary motion is given to the gear wheel G⁶ at every revolution of the cam wheel C. The rotary motion of the gear wheel G⁶ is transmitted to the cam wheel G⁴, and the latter, by its cam grooves G³ and its rim acting on the friction roller G², imparts a longitudinal sliding motion to the bar G' and the shifting arm G, so that the latter by engaging either of the collars E⁷ and E⁸, moves the shaft E³ longitudinally. When the bar G' slides outward to the left, the arm G presses on the collar $E^7$ so as to move the shaft $E^3$ outward, thus moving the bracket $F^7$ and the cone $E^2$ in the same direction, and at the same time, the bracket $F^7$ by the chain $F^9$ (see Fig. 4) imparts a sliding motion, to the right, to the bracket $F^6$, whereby the cone $E'$ and its shaft $E$ are carried in the same direction, that is, in an opposite direction to the movement of the cone $E^2$. The cones $E'$ and $E^2$ are thus separated. When the arm G moves inward, to the right, it presses on the collar $E^8$, thus moving the cone $E^2$ inward, and at the same time the connection by chain $F^9$ between the brackets $F^7$ and $F^6$ shown in Fig. 1, causes an inward sliding of the cone $E'$, to bring the two cones into engagement with each other at their small ends. The wire is passed from a spool, not shown, to a feeding device H which, at the beginning of the operation, delivers the end of the wire to the base end of the cone $E^2$. This feeding device H is provided with a feed carriage $H'$, on the top of which is mounted to turn a disk $H^2$ adapted to be fastened in place by a set screw $H^3$ screwing in one end of the said feed carriage, as is plainly illustrated in Figs. 1 and 2. Through an aperture in the disk $H^2$ passes the wire, as shown in Fig. 9, and on the top of the disk are arranged two parallel lugs $H^4$ between which is hung an eccentric pawl $H^5$, having its free end serrated or roughened and resting on the top of the wire, as is shown in said Fig. 9. The pawl $H^5$ hangs inward and permits the wire to pass through the disk $H^2$ in an inward direction, but prevents an outward movement of the wire, as then the roughened surface of the pawl wedges on the wire, thus locking the latter in place in the disk $H^2$.

Figures 1, 2:
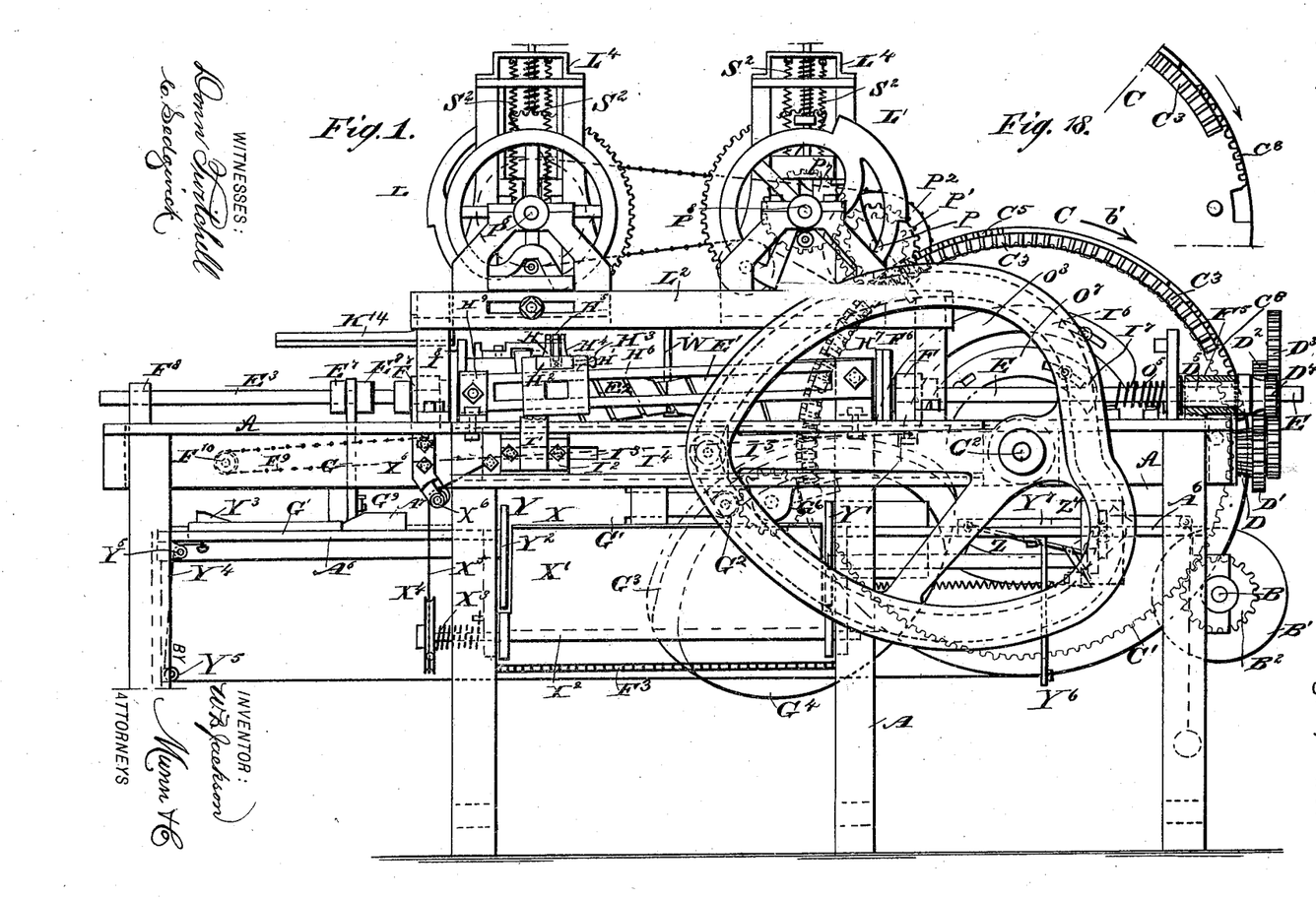
Figure 1 is a side elevation of the improvement, with parts in section.
Fig. 2 is a plan view of the same with parts in section.
Figure 2:
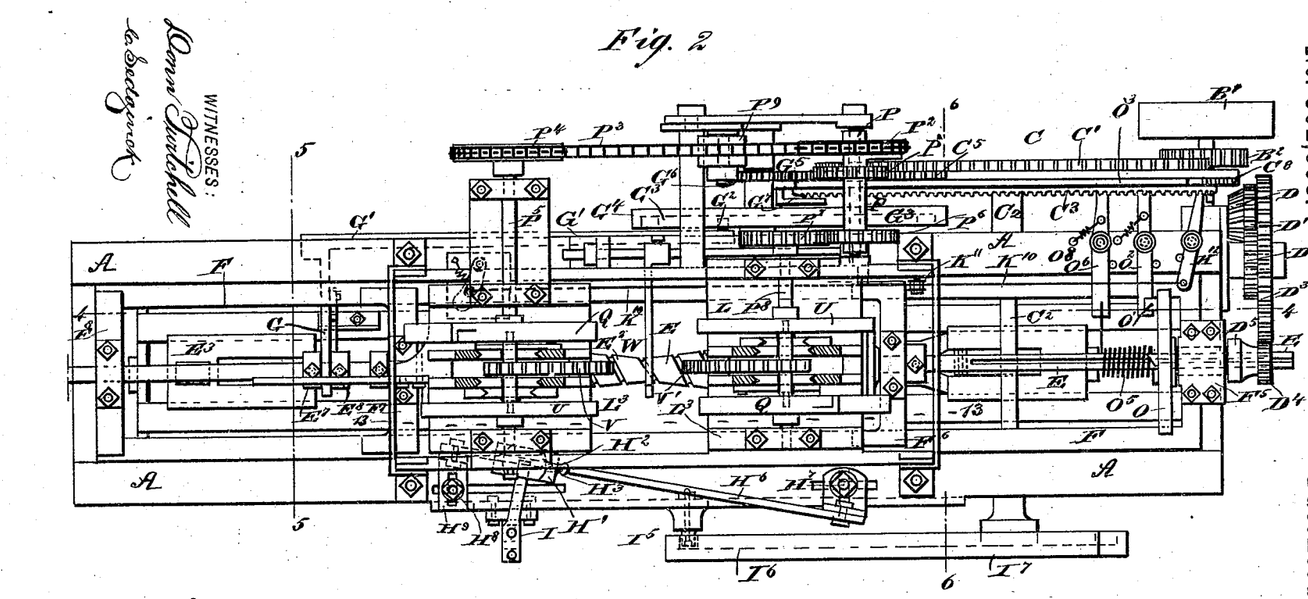

The feed carriage $H'$ is mounted to slide longitudinally on a guide $H^6$, formed with a longitudinal slot and pivoted at its ends to brackets $H^7$, $H^9$, held transversely adjustable on the top of the main frame A, at the front side thereof, see Figs. 1, 2 and 5. The bracket $H^9$ is also held adjustable longitudinally on the top of frame A by a bolt $H^8$ held on the bracket and engaging a slot in the top of the frame A, see Fig. 2. This longitudinal adjustment of bracket $H^9$ is necessary to permit of using a shorter guide $H^6$ in case shorter cones are used for smaller sized springs. The guide $H^6$ runs oblique to the vertical plane of the cones to allow a sufficient length of wire to be drawn through the carriage $H'$ so that the wire will pass under the lock on spring band on cone $E^2$ as hereinafter more fully explained. The guide $H^6$ also extends oblique to the horizontal plane of frame A, the end at bracket $H^7$ being somewhat higher than the end on bracket $H^9$ as will be readily seen by reference to Fig. 1. By this inclined arrangement of the guide $H^6$ relative to the top of frame A the carriage $H'$ is raised as it travels from left to right on said guide $H^6$, and consequently the wire is carried sufficiently high above the cone $E'$ to allow the lower jaw of the cutter to pass under the wire as will be further referred to hereinafter.

The carriage $H'$ is provided with a transversely extending opening registering with the slot in the guide $H^6$, and into this opening extends a transverse arm I held on a vertically arranged arm $I'$, attached to a block $I^2$ held longitudinally adjustable in a slot $I^3$ of a slide $I^4$, mounted to slide longitudinally in suitable guideways arranged on the front side of the main frame A. On the right hand end of this slide $I^4$ is arranged a friction roller $I^5$ engaging a cam groove $I^6$ of a cam wheel $I^7$ secured on the front end of the shaft $C^2$ carrying the cam wheel C. The cam wheel $I^7$ is approximately heart-shaped as is plainly indicated in Fig. 1, and serves to impart a forward and backward sliding motion to the slide $I^4$, and by means of the arms I and $I'$ to the carriage $H'$ at every revolution of the cam wheel C. It will be seen that when the cam wheel $I^7$ imparts a sliding motion to the slide $I^4$, and consequently to the carriage $H'$ from left to right, see Fig. 2, then the said carriage travels outwardly and upwardly on the oblique guide $H^6$ for the purpose above mentioned. On the return movement of the carriage on the guide $H^6$ it passes inward and downward as will be readily understood, to bring the carriage back to its normal position for again feeding a wire for a new spring. The end of the wire passing through the feeding device reaches onto the top of the base of the cone $E^2$, the end passing under an arm $J'$ formed on the free end $J^2$ of a spring band J fastened at its upper end $J^3$ to the periphery of the base end of the cone $E^2$. The spring band J extends about one and one-fourth turns around the base of the cone $E^2$ when in a closed position, the spring band having the tendency to remain in a closed position until its free end is pressed on by the arm $J'$, so as to uncoil, in the manner hereinafter more fully described. The end of the wire, under the arm $J'$, rests on top of the band J near its fastened end $J^3$, as is plainly shown in Fig. 13, and when the mandrel is turned for forming the spiral spring, then the wire passes into a groove $J^4$ formed spirally in the spring band and being a continuation of the end of the spiral groove $E^5$ in the cone $E^2$.

In order to hold the end of the wire in place between the end $J^3$ of the spring band J and the arm $J'$, the spring band is drawn tightly shut by pushing on the arm $J'$; this is done by engaging the said arm $J'$ with a lug $K'$ formed on a lever K, fulcrumed on the periphery of the base end of the cone $E^2$. The outer end of the lever K is adapted to be locked in place by a spring-pressed bolt $K^2$ arranged radially in the cone $E^2$, as is plainly shown in Figs. 13 and 16. The bolt $K^2$ is provided, at its outer end, with a projection $K^3$ adapted to be engaged by a lug $K^4$ (see Fig. 4), fastened to one side of an arm $K^5$, pivoted in a bracket $K^6$ attached to the under side of the frame of one of the knotting or bending devices L, supported from the main frame A above the cone $E^2$ near its base end. This arm $K^5$ is also provided with a lug $K^7$ arranged at the end opposite the lug $K^4$, and this lug $K^7$ is adapted to engage the arm $J'$ so as to open the spring band J for the purpose of taking the recoil from the end coil of the spiral spring to be made before the knot is made.

The pivoted arm $K^5$ is adapted to spring transversely so as to bring the lugs $K^4$ and $K^7$ into the path of the spring-pressed bolt $K^2$ and the arm $J'$ at the proper time, as hereinafter more fully described, and when the cone $E^2$ revolves. The arm $K^5$ is held in a rearmost normal position by means of a spring $K^8$, so that the lugs $K^4$ and $K^7$ are out of the path of the spring-pressed bolt $K^2$ and the arm $J'$, during the time the cone $E^2$ revolves and the wire is coiled thereon. The arm $K^5$ is caused to swing forward to bring the lugs $K^4$ and $K^7$ into the path of the locking bolt $K^2$ and the arm $J'$ respectively, by means of a lever $K^9$ extending horizontally and pivoted on the bracket $K^6$. The free end of the lever $K^9$, see Figs. 10 and 16, presses on the back of the pivoted arm $K^5$ and is connected with a cord $K^{10}$, see Fig. 4, extending longitudinally and passing over a pulley $K^{11}$ journaled on the frame of the knotting device $L'$. The end of the cord $K^{10}$ is connected with a lever $K^{12}$, fulcrumed on the top of the frame A near the right-hand end, and the free end of the lever is adapted to be engaged, at the proper time, by a lug $C^7$ attached to the face of the cam wheel C. When the latter revolves, the lug $C^7$ presses on the lever $K^{12}$ so as to swing the same to cause a pull on the cord $K^{10}$, which latter, by being connected with the lever $K^9$, swings the same against the back of the pivoted arm $K^5$, thus swinging the same forward against the tension of the spring $K^8$ and to bring the lugs $K^4$ and $K^7$ into the path of the spring-pressed bolt $K^2$ and the arm $J'$ respectively. As soon as the lug $C^7$ has passed the lever $K^{12}$, the arm $K^5$ is returned to its normal position by the action of the spring $K^8$, and the lever $K^9$ is also returned to its normal position by a spring $K^{13}$, shown in Fig. 10. When the spring band J is opened out by the lug $K^7$, the arm $J'$ snaps behind a spring-pressed bolt N fitted to slide on a plate $N'$ held in one wall of a recess $E^{10}$ of the cone $E^2$. A notch $E^{11}$ extends from one end of the said recess, as is plainly shown in Fig. 13. The spring bolt N is held in an outermost position by a coil spring $N^2$, see Fig. 14; when the bolt is in this outermost position the free end of the spring band J rests on one side of it, thus holding the spring band open, as shown in said Fig. 14, and until the spring bolt N is again forced inward by means on the knotting device L, hereinafter more fully described. The spring bolt N is formed on one side with a lug $N^3$, see Fig. 17, acted on by the said means to force the bolt inward. The outward sliding motion of the bolt is limited by stops $N^4$ held on the plate $N'$. On the other cone $E'$ is arranged a spring band $J^7$, similar in construction to the spring band J, and provided in addition with a circular guide arm $J^8$ held on the cone $E'$, to prevent sidewise displacement of the spring band $J^7$, when open or when springing shut. This spring band $J^7$ is opened in a different manner from the spring band J, and is held in an open position by means connected with the knotting device $L'$ located over the cone $E'$, but similar in construction to the knotting device L and operating in conjunction with the same. As previously mentioned, the shaft E receives an intermittent rotary motion for coiling the wire on the cones $E^2$ and $E'$, the wire being fed by the feeding device H, as described. The cones $E'$ and $E^2$ are also rotated in an opposite direction, as before mentioned, for actuating the spring band $J^7$ and for this purpose the following device is provided:—On the shaft E of the cone $E'$ and near the bearing $F^5$, is secured a disk O, (shown in detail in Fig. 8) provided on one face with a slotted stop $O'$, adapted to be engaged by one end of a lever $O^2$ extending transversely and pivoted on top of the frame A, as is plainly shown in Fig. 2; this lever $O^2$ is spring-pressed so that it is held in engagement with the stop $O'$, thereby locking the shaft E and holding the mandrel in a locked position to prevent the cones from turning until the wire is placed under the arm $J'$ and also prevents the cone $E'$ from turning during the time the cones are separated. The outer end of the lever $O^2$ is adapted to be engaged by a cam arm $O^3$ held on the front face of the cam wheel C, the said cam arm $O^3$ pressing the said lever $O^2$, previous to the bevel segmental gear wheel $C^3$ engaging the bevel gear wheel D. Thus, when this cam arm $O^3$ disengages the lever $O^2$ from the stop $O'$, the shaft E is unlocked, and when the segmental gear wheel $C^3$ then engages the bevel gear wheel $D'$, the shaft E can be rotated to coil the spring, as previously described.

Figure 13:
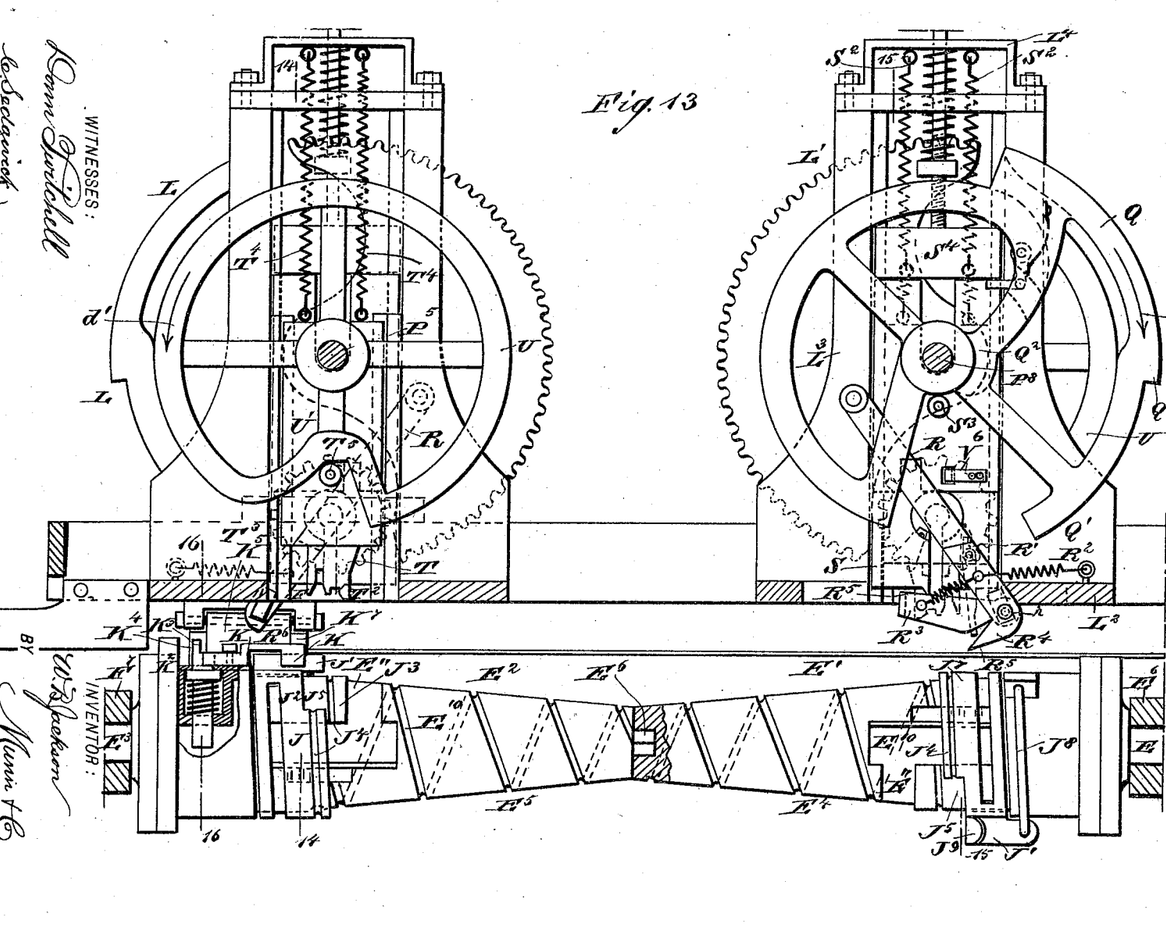
Fig. 13 is an enlarged sectional side elevation of the mandrel, the device for clamping and bending the ends of the wire, and the mechanism for actuating the said device, the section being taken on the line 13—13 of Fig. 2.
Figures 14, 15:
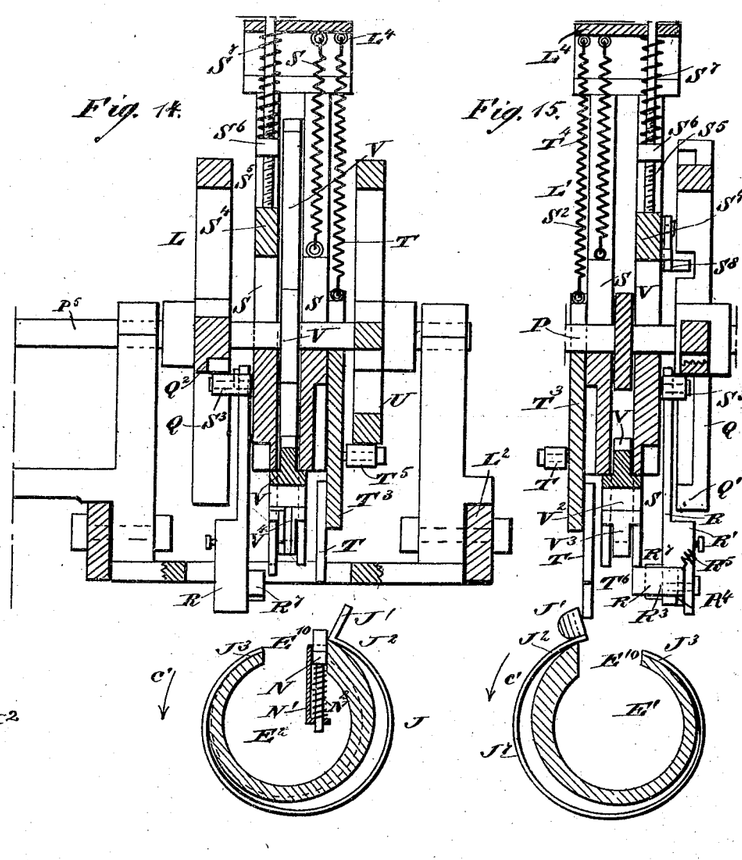
Fig. 14 is a transverse section of the same, on the line 14—14 of Fig. 13.
Fig. 15 is a similar view of the same on the line 15—15 of Fig. 13.
Figure 16:
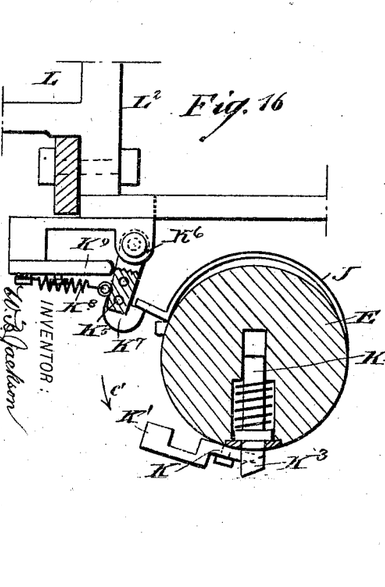
Fig. 16 is a like view of part of the same on the line 16—16 of Fig. 13.
Figure 17:
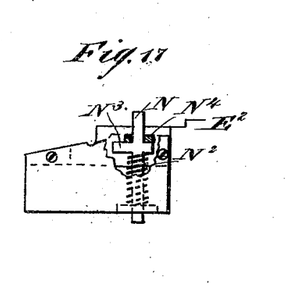
Fig. 17 is a sectional side elevation of part of the same, on the line 17—17 of Fig. 10.

On the disk O (see Fig. 1) is secured one end of a spring $O^5$, coiled a number of times on the shaft E and extending transversely at its free end to be engaged by a lever $O^6$ arranged alongside the lever $O^2$ which lever $O^6$ is also spring-pressed on the fulcrum on top of the frame A. The rear end of this lever $O^6$ is adapted to be engaged by a cam projection or lug $O^7$ held on the front face of the cam wheel C, next to the cam projection $O^3$ previously mentioned. This lever $O^6$ is held out of the path of the free end of the coil spring $O^5$ by the projection $O^7$, during the time the shaft E is rotated from the segmental gear wheel $C^3$ when the spring is coiled on the cones $E^2$ and $E'$; but after the projection $O^7$ has left the lever $O^6$, the spring of the latter moves it into a normal position so as to swing it into the path of the free end of the spring $O^5$, and when the latter strikes the said lever, its further turning is interrupted and the spring $O^5$ is wound up during the last few revolutions of the shaft E. Thus, when the segmental gear wheel $C^3$ finally leaves the bevel gear wheel D, the force of the coil spring $O^5$ is exerted on the shaft E, and the latter is rotated in an opposite direction. The lever $K^{12}$ is actuated by the lug $C^7$ during the last revolution of the cones in the operation of winding the wire. The cones, and consequently the disk O moving in the direction of the arrow, see Figs. 16 and 6, as soon as the arm J' and lever K have passed the lugs $K^7$ and $K^4$ and the cones commence their last revolution, the lever $K^{12}$ is actuated by lug $C^7$. When the arm J' and lever K come around they strike the lug $K^7$ and the end $K^3$ of spring pressed bolt $K^2$ strikes the lug $K^4$, and the spring band J is opened as shown in Fig. 16. The apertures in the cones E' and $E^2$ are now turned nearly horizontal to the vertical plane of the knotting devices L and L'. When the cones are in position, shown in Fig. 16, the arm J' on spring band $J^7$, cone E', is in position behind lever $T^6$, shown in Fig. 15, but the spring band $J^7$ is still closed, the apertured cone E', being about opposite the mark $J^7$, Fig. 15. Now, the segmental gear $C^3$ leaves the wheel D and the cones are rotated by the coil spring $O^5$ in the inverse direction of the arrows, Figs. 6, 14, 15 and 16, to bring the apertures in position, Figs. 15 and 14, and also to open spring band $J^7$ as shown in Fig. 15. The disk O reverses with the cones and the stop $O^4$ strikes the lever $O^2$ on the under side, and so holds the cones by pressure of the spring $O^5$ in position for the knotting operation, as shown in Figs. 15 and 16. When the knotting operation is completed, the lever $O^2$ is lifted from stop $O^4$ by lug $O^8$. The cones again reverse until the slotted stop O' engages lever $O^2$. This brings the cones in their original position shown in Fig. 13. The coil spring $O^5$ can now be released from lever $O^6$, the slotted stop preventing the cones turning in either direction.

The two knotting devices L and L' are very similar in construction, so that it suffices to describe but one, the difference between the two being clearly pointed out hereinafter. It may be remarked here, that in practice both of these devices are slightly inclined to the vertical plane of the main frame A. Movement is given to the knotting devices L and L' from the cam wheel C, which is provided for this purpose with a pin, and segmental gear teeth for imparting an intermittent rotary motion to a segmental pinion P' fastened on a shaft P mounted to turn in suitable bearings formed in the frame of the knotting devices L'; see Fig. 18. The device for imparting this intermittent rotary motion to the shaft P is similar to the one described in reference to the mechanism for imparting motion to the arm G from the said cam wheel C.

On the shaft P is secured a sprocket wheel $P^2$ connected by a sprocket chain $P^3$ with a sprocket wheel $P^4$ secured on the shaft $P^5$ and which is the main driving shaft for the knotting device L, as will be readily understood by reference to the drawings. On the shaft P is also secured a gear wheel $P^6$, see Figs. 2 and 4, in mesh with a gear wheel $P^7$ secured on the shaft $P^8$ which is the main shaft for the knotting device L'.

In order to give sufficient tension to the sprocket chain $P^3$, a tightening roller $P^9$ is provided, mounted on a lever $P^{10}$ fulcrumed on the frame of the knotting devices and held adjustably thereon by a suitable bolt engaging a slot in the said lever, and held in the framework of the knotting devices, see Fig. 4. When the cam wheel C is rotated, see Fig. 18, then its pin engages the arm on the segmental pinion P', so as to turn the latter sufficiently to bring it in mesh with the segmental gear wheel on the said cam wheel C. The further rotation of the latter causes the segmental pinion P' to turn so that the shaft P is rotated until the flat surface of the said pinion P' again comes in contact with the smooth part of the cam wheel C at the end of the segmental gear wheel thereon. The rotary motion of the shaft P is transmitted by the sprocket wheel $P^2$, chain $P^3$, and sprocket wheel $P^4$, to the shaft $P^5$ of the knotting device L, and at the same time a rotary motion is transmitted by the said shaft P, and the gear wheels $P^6$ and $P^7$ to the shaft $P^8$. It is understood that the rotary motion of the shafts $P^5$ and $P^8$ ceases as soon as the segmental gear wheel on the cam wheel C leaves the segmental pinion P'.

On the front end of the shaft $P^8$ of the knotting device L' is secured a cam wheel Q, formed at its periphery with an inwardly-projecting lug Q' adapted to engage a projection R' on a lever R fulcrumed on the front side of the standards $L^3$ supported on the frame $L^2$ for the knotting device. A spring $R^2$ presses on this lever R to hold it in a normal position, as shown in Fig. 13, the lower or free end of the lever resting against the bed of the frame $L^2$. A knife $R^3$ is pivoted at $r$ to the free (lower) end of the lever R and works in contact with a blade $R^4$ which is fixed on or formed integral with the said end of the lever. A spring $R^5$ holds the knife $R^3$ in an uppermost position, so as to permit the wire to be cut off to pass between the cutting edge of the knife $R^3$ and the fixed knife $R^4$. When the lever R is acted on by the lug Q' on the revolving of the cam wheel Q in the direction of the arrow shown in Fig. 13, then the lever is swung to the left, whereby the wire to be cut off passes between the two knives $R^3$ and $R^4$. The free end of the pivoted knife $R^3$ is provided with a transverse arm or projection $R^6$ adapted to be pressed on by a slide S fitted to slide vertically on the standards $L^3$. The said slide, in its downward motion, pressing on the arm $R^6$, causes a closing of the knife $R^3$, so that the wire is cut off between the knives $R^3$ and $R^4$. The slide S is also part of the mechanism for bending the wire, as hereinafter more fully described. The slide S is formed with a longitudinally extending groove, and is returned into its normal uppermost position by springs $S^2$ connecting the upper rear end of the slide with a cap $L^4$ supported on the standards $L^3$. See Figs. 13, 14 and 15.

On the front of the slide S is arranged a friction roller $S^3$ adapted to be engaged by a cam projection $Q^2$ formed on the inside of the cam wheel Q near the shaft $P^8$, the said projection acting on the said friction roller $S^3$ after the lug $Q'$ has swung the lever R to the left, as previously described, to pass the wire between the two knives. When the slide moves downward the knife is closed by the action of the cam $Q^2$ on the friction roller $S^3$, so that the end of the wire is cut off. The slide S is adapted to pass, with its lower end, into the recess $E^{10}$ in the end of the respective cone $E'$ or $E^2$, see Fig. 11, after the knives have cut off the end of the wire. The lever R is part of the other knotting device L, and is acted on by a cam wheel Q in a similar manner, but the knife mechanism is dispensed with as the wire is not cut off at this end of the machine. At the time the wire is cut off, the wire on the spring plate $J^7$ is clamped thereon by a clamping plate T, formed with two notches $T'$ and $T^2$, of which one engages the outermost end of the wire, while the other engages the first coil. In the knotting device L, the notch $T'$ engages that end of the wire which projects past the arm $J'$ of the spring band J. This clamping plate T is secured on the lower end of a slide $T^3$ mounted to slide on the rear of the standards $L^3$ of the knotting device $L'$ but on the front of the knotting device L. By reference to Figs. 14 and 15, as well as to Fig. 13, it will be understood that the lever R is on the front of the knotting device $L'$ and in the rear of the knotting device L. The slide $T^3$ is held in an uppermost position in its guideways by means of springs $T^4$ connecting the upper end of the slide with the cap $L^4$. The slide $T^3$ is also provided with a friction roller $T^5$ adapted to be engaged by a cam wheel U secured on the respective shaft $P^8$ or $P^5$, it being understood that the cam wheel U on the shaft $P^5$ is located in front of the machine, while the cam U on the shaft $P^8$ is located at the rear. The slide $T^3$ moves downward to engage the wire by means of its plate T about the time the lever R commences to swing, and the wire is clamped previous to the cutting off at the knotting device $L'$. When the slide S is drawn from the cones by the springs $S^2$, it comes back with great force and in order to break this force a buffer device presently to be described is used. A buffer plate $S^4$ is adapted to engage the upper end of the slide S and is hung on a rod $S^5$ guided in the cap $L^4$, and provided on its threaded portion with a nut $S^6$ on which rests the lower end of a spring $S^7$ coiled on the rod $S^5$ and resting, with its upper end, against the cap $L^4$. A catch $S^8$ is pivoted on the standard $L^3$ and is adapted to engage the buffer plate $S^4$ so as to hold the same in position. When the slide S is moving downward, the catch is tripped and the buffer plate drops down. When the slide S is returned it strikes the buffer plate and forces it above catch $S^8$ which latter prevents the buffer plate from pressing the slide S out of its normal position.

Figures 10, 12:
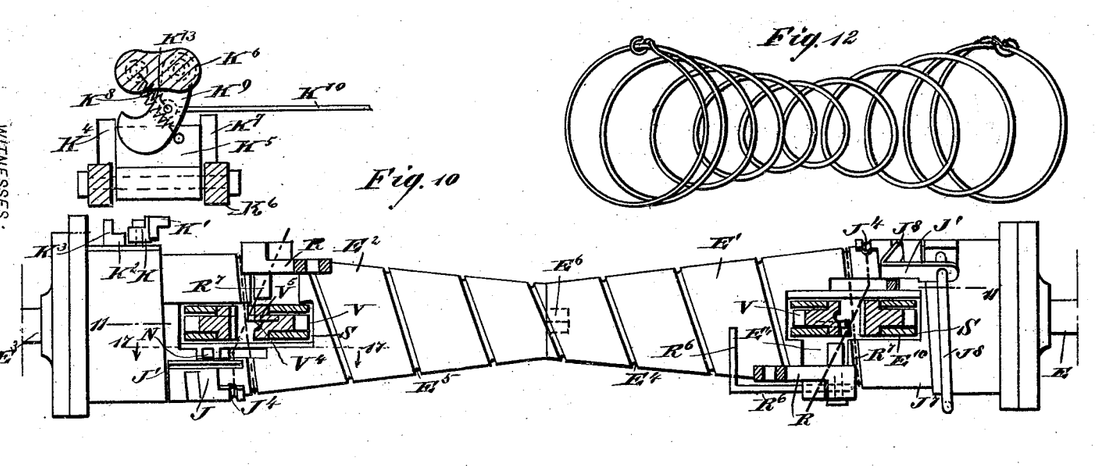
Fig. 10 is an enlarged plan view of the mandrel, with the wire clamping and bending device in section on the line 10—10 of Fig. 11.
Fig. 12 is a perspective view of the finished spring.

On each lever R is formed a projection $R^7$ located at the knotting device L in the rear of the fixed knife $R^4$, so as to engage the free end of the wire to move it across the first coil, as indicated in dotted lines in Fig. 10. The crossing of the wire is necessary at each end of the spring so as to form the knot to lock the ends of the spring to the first coil, as will readily be seen by reference to the finished spring illustrated in Fig. 12.

Figure 11:
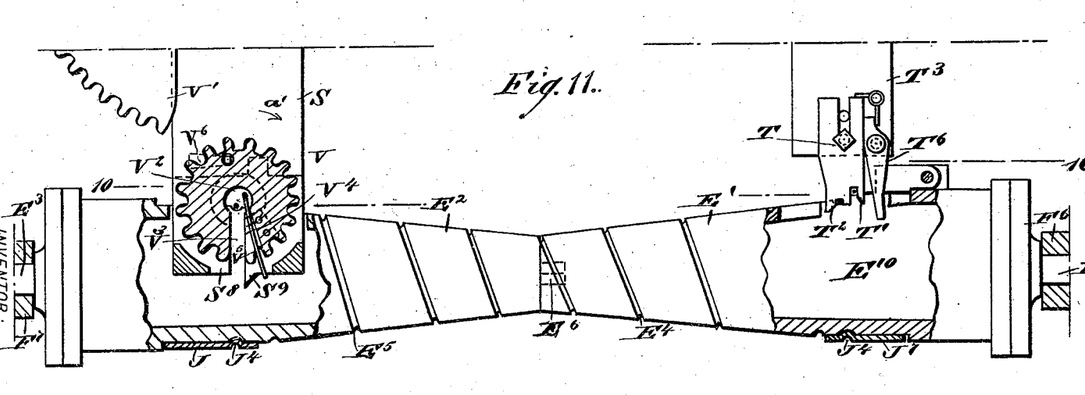
Fig. 11 is a sectional side elevation of the same, on the line 11—11 of Fig. 10.

In order to move the spring plate $J^7$ into an open position, as previously mentioned, a spring-pressed arm $T^6$ is provided pivoted on the slide $T^3$ next to the clamping plate T, as will be seen by reference to Figs. 11 and 15. The lower end of this arm $T^6$ projects below the lower edge of the clamping plate T, and is in the path of the arm $J'$ of the said spring band $J^7$ to engage the latter for opening the spring band when the cone $E'$ revolves in an opposite direction. It is understood that this arm $T^6$ operates the band $J^7$ in a manner similar to that in which the lug $K^7$ of the arm $K^5$ operates the arm $J'$ of the band J. After the wire is crossed at each end of the spiral spring on the cones $E'$ and $E^2$, the slide S moves into its lowermost position by passing into the recesses $E^{10}$ of the cones $E'$ and $E^2$, see Fig. 11.

In the end of each slide S of the two knotting devices L and $L'$, is arranged a gear wheel V adapted to be engaged, when the slide is in this lowermost position, by a segmental gear wheel $V'$ secured on the shaft $P^8$ or $P^5$ so as to rotate the said gear wheel V at the proper time. The hub of each gear wheel V is formed with a transverse opening $V^2$ continuing into a slot $V^3$ adapted to register with a vertical slot $S^8$ formed in the sides of the slide S, so that when the latter moves downward, as shown in Fig. 11, the two parts of the crossed wires pass through the slots $S^8$ and $V^3$ to finally pass into the central opening $V^2$ in the hub of the wheel V. The end of the wire is engaged by a radially arranged groove $V^4$ formed in one side of the slot $V^3$ in the wheel V, it being understood that the wire is passed into this position by being engaged by a projection $S^9$ on the slide S.

A plate $V^5$ is secured on one face of the gear wheel V, so as to hold the rear end of the slot $S^8$ partially closed during the time the end of the wire is pressed or passed into a radial position when engaging the notch $V^4$. The parts are then in the position shown to the left in Fig. 11, and at this time the segmental gear wheel $V'$ engages and turns the gear wheel V in the direction of the arrow $a'$, so that the end of the wire held in the notch $V^4$ is carried around that part of the first coil which extends through the transverse opening V². The gear wheel V makes two revolutions so that the end of the wire is completely bent around the first coil, as will be seen by reference to Fig. 12. When the slide T³ of the knotting device L moves downward, it clamps the end of the wire in the first coil by its plate T, as previously described, and at the same time it acts with one edge on the projection N³ of the bolt N, so that the latter is moved inward and releases the free end of the open spring band J which latter thus slightly closes, that is, moves over the top of the bolt N and abuts against the clamping plate T. It is understood that by the opening of the spring bands J and J⁷, previous to the entering of the slides S into the recesses E¹⁰ of the cones E' and E², the recoil of the spring is taken up near the base ends of the cones E' and E², while the remainder of the spring remains firmly on the cones between their bases during the process of bending, to form the knot as above described. After the knot is formed, the slides S recede, the segmental gear wheels V' then having left the gear wheel V to permit upward movement of the slides S.

Figure 3:
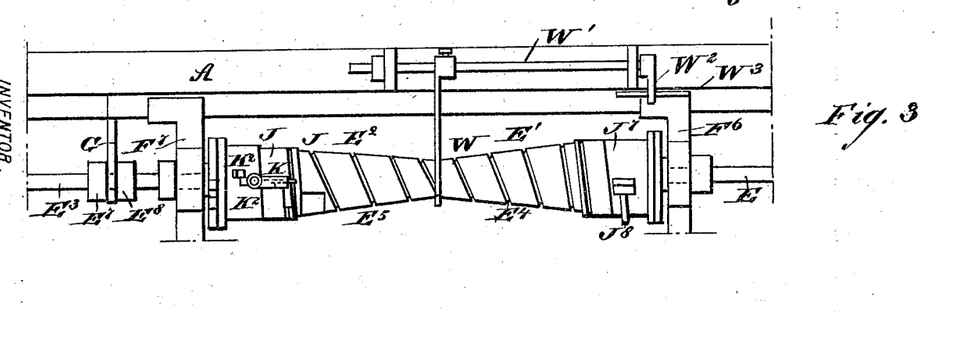
Fig. 3 is a plan view of the mandrel and adjacent parts.
Figure 7:
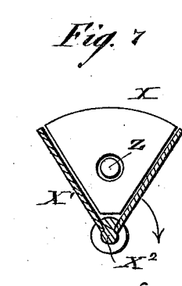
Fig. 7 is a transverse section of the trough for the spring.

It is understood that neither of the gear wheels V has a shaft, but the hub of each wheel is mounted to revolve in suitable bearings formed in the lower ends of the slide. Each of the gear wheels V is held in a locked normal position, as shown in Fig. 11, by a spring catch V⁶ fastened on the slide S and projecting through an opening in the same to engage a recess in one face of the wheel V, as will be readily seen by reference to Figs. 11 and 13. The spring catch V⁶ disengages the recess in the wheel V when the latter is turned by the segmental gear wheel V', the spring giving sufficiently to disengage the recess. It is further understood that the lever R moves the end of the spring to be formed into the proper position to be engaged by the slots S⁸ and V³, the movement of this part of the lever being derived from the cam wheel Q, provided for this purpose with a shoulder Q³ in its rim, the said shoulder engaging the lever R at the proper time to cause the said lever to move the free end of the wire into the position indicated by the dotted lines in the cones in Fig. 10. After the spring is thus formed, the slides S, as well as the slides T³, recede, so that the spring bands J and J⁷ fly shut whereby the spiral spring is lifted, at its base ends, and consequently the recoil transmits itself to that part of the spring still engaging the spiral grooves E⁴ and E⁵ in the cones E' and E². At this time the cones E' and E² separate, the spring being, however, held in position by an arm W extending between two adjacent coils of the spring at the middle at the junction of the two cones E' and E², as will be seen by reference to Fig. 1. This arm W is secured on a shaft W' extending longitudinally and mounted to turn in suitable bearings on the rear side and on top of the main frame A. On one end of the shaft W', is held an arm W² adapted to be engaged by an incline W³ fastened to the bearing F⁶, see Fig. 3, so that when the bearing F⁶ slides outward, to the right, the arm W² slides down the incline W³, thereby turning the shaft W' and causing the arm W to spring downward to pass between two adjacent coils of the spring, as before described. The finished spring is thus held in place at the time the cones E' and E² slide outward away from each other, by the action of the arm G, as previously described. When the two cones have opened sufficiently so that their small ends have passed the base ends of the spiral finished spring, then the latter drops down into a box X arranged below the cones E' and E² when the latter are in a closed position. The box X, see Figs. 4 and 7, is provided with two sides X' arranged in V-shape and fastened, at their lower ends, on a shaft X² mounted to turn in suitable bearings arranged on the main frame A. The shaft X² extends longitudinally and is provided, on its left, on the end, (see Fig. 4,) with a coil spring X³ fastened by one end to the frame A and by its other end to a wheel X⁴ attached to the shaft X². On the periphery of the wheel X⁴ is fastened one end of a cord X⁵ extending around the said wheel, and then passing over a pulley X⁶ to connect with the slide I⁴, see Fig. 1. When the slide I⁴ moves to the right, at the time the wire is fed onto the cones for forming the spiral spring, then the said slide pulls on the cord X⁵ and thus rotates the pulley X⁴ so as to turn the shaft X², thereby swinging the box X to one side to dump the previously formed spring to one side of the main frame A. On the return motion of the slide I⁴, the spring X³ returns the box X to its normal position.

The ends of the box X are formed by two plungers Y and Y' adapted to pass between the two sides X', to compress the previously formed spring. The spring thus compressed is permitted to recoil and assist the weight to force the plungers from the box. The plunger Y is secured on a slide Y² fitted to slide longitudinally in suitable guideways A⁶ supported on the main frame A, on the left, on the side thereof. Near the outer end of the slide Y² is formed a V-shaped lug Y³ adapted to be engaged, at its back, by a pawl G⁹ pivoted to the arm G which opens the cones, as previously described. When the arm G moves outward, in separating the cones, the pawl G⁹ travels up the incline of the lug Y³ and finally drops to the back of the same, so that when the arm G returns, that is moves inward, it carries along the slide Y², thereby moving the plunger Y into the box X. The slide Y² is connected by a cord Y⁴ with an arm Y⁶ projecting from a slide Y⁷ carrying the other plunger Y'. The slide Y⁷ is fitted to slide longitudinally on guideways A⁶, similar to the guideways for the slide Y², and arranged on the right-hand side of the main frame A.

The cord $Y^4$ passes over rollers $Y^5$ held on the frame A, as is plainly seen in Figs. 1 and 4. Thus, when the slide $Y^2$ and its plunger Y move inward by the action of the pawl $G^9$ on the lug $Y^3$, the other slide $Y^7$ is moved to the left, and its plunger $Y'$ also moves into the box X, so that the two plungers move toward each other to compress the spring.

In suitable bearings on the slide $Y^7$ is fitted to slide longitudinally, a core Z adapted to pass through the plunger $Y'$ so as to pass centrally through the spring previous to its compression by the plungers Y and $Y'$. This core Z is formed, at its outer end, with a head $Z'$ on which presses a coil spring $Z^2$ attached, at its inner end, to the plunger $Y'$, as can be readily seen in Fig. 4. The head $Z'$ is adapted to be engaged by a lug $Z^3$ formed on the free end of an arm $Z^4$, pivoted on the slide $Y^7$. On the free end of this arm and to one side thereof, is arranged an inclined arm $Z^6$, adapted to be engaged by an arm $Z^7$ fulcrumed on a bracket $Z^8$ held vertically adjustable on the guideway $A^6$ for the slide $Y^7$. When the slide $Y^7$ moves inward to move the plunger $Y'$ into the box X, then the pivoted arm $Z^7$ engages the incline $Z^6$, thus causing the arm $Z^4$ to swing upward to disengage the lug $Z^3$ from the head $Z'$, whereby the spring $Z^2$ forces the core Z suddenly inward, centrally through the spring, to form a core for the same. The spring is then compressed by the two inwardly moving plungers Y and $Y^7$ at the time the cones $E^2$ and $E'$ move toward each other. When the two plungers Y and $Y'$ move toward each other, in compressing the spring, the plunger Y comes in contact with the inner end of the core Z, thus causing the latter to slide outward in its bearings in the slide $Y^7$. By this movement the head $Z'$ swings the arm $Z^4$ upward, so that finally the lug $Z^3$ drops against the inner edge of the head $Z'$ and thereby locks it in place in an outermost position, as shown in Fig. 4. On the return or outward movement of the plunger $Y'$, the pivoted arm $Z^7$ travels up the incline $Z^6$ and finally drops in front of the same so as to be in position to again swing the arm $Z^4$ upward to release the core Z, as previously described, and at the time the plunger $Y'$ starts forward to again assist in compressing one of the springs in the box X.

The return or outward movement of the plungers Y and $Y'$ is accomplished by the recoil of the compressed spring, and by means of a rope $Y^8$ connected with the slide $Y^7$, and passing over a pulley $Y^9$ held in the right-hand end of the frame A. The downwardly extending part of the rope $Y^8$ supports a weight $Y^{10}$ which draws the slides $Y^7$ and $Y^2$ apart at the time the pawl $G^9$ releases the lug $Y^3$ on the slide $Y^2$. The releasing of the pawl $G^9$ is accomplished by the said pawl traveling up a fixed wedge $A^7$ attached to the guideway $A^6$ for the slide $Y^2$. The pawl $G^9$ travels up this wedge $A^7$ at the time the arm G is nearing the end of its inward stroke, see Fig. 4. As the pawl $G^9$ is raised it disengages the lug $G^3$, thus permitting the weight $Y^{10}$ to exert a pull on the slide $Y^7$ thus moving the latter outward, and by the connection previously described the slide $Y^2$ is also moved outward so that the plungers Y and $Y'$ finally pass out of the box X, as shown in Fig. 4.

The operation is as follows: When the several parts of the machine are in the position illustrated in Fig. 1, and the main shaft B is rotated, a rotary motion is given to the cam wheel C so that the latter revolves in the direction of the arrow $b'$. The projections $O^3$ and $O^7$ on the face of the cam wheel C have acted on the levers $O^2$ and $O^6$ so that the disk O is unlocked by the lever $O^2$ and the lever $O^6$ is out of the path of the free end of the spring $O^5$. The segmental gear wheel $C^3$, on the cam wheel C, now engages the bevel gear wheel D and a rotary motion is transmitted by the several gear wheels to the shaft E, as previously described. The cones $E'$ and $E^2$ of the mandrel are thus revolved in the direction of the arrow $c'$, see Figs. 8, 14, 15 and 16, and as the wire is clamped on the spring band J under the arm $J'$, as before described, the wire is fed into the grooves $E^5$ and $E^4$ of the cones $E^2$ and $E'$ on the further revolving of the mandrel. At the same time, the carriage $H'$ of the feeding device H, moves to the left so that the wire is properly guided to the grooves $E^5$ and $E^4$. The wire is thus coiled in a double spiral on the cones, the carriage $H'$ traveling as before explained. The oblique motion of the carriage $H'$, with respect to the cones, is given to allow sufficient length of wire to be drawn through the carriage, so that when the wire is now cut by the knives $R^3$ and $R^4$ it will pass under the arm $J'$, when the carriage $H'$ moves back and leave enough projecting beyond the said arm to form the knot on this end of the next spring. As the cones $E^2$ and $E'$ are making the last revolutions, the projection $O^7$ on the cam wheel C permits the lever $O^6$ to swing to its normal position, shown in Fig. 2, so as to catch the end of the coil spring $O^5$, whereby the latter is wound up. At the same time, the projection $C^7$ on the cam wheel C, actuates the lever $K^{12}$ so that the arm $K^5$ is swung forward to move the lug $K^6$ in the path of the arm $J'$ of the spring band J, and at the same time the bolt $K^3$ is depressed by the lug $K^4$ so that the spring band J is forced open during the last revolution, the arm $J'$ passing behind the locking bolt N so that the spring band is locked in an open position. When the spring band J is in this position, see Fig. 16, the arm $J'$ of spring band J has just passed the lever $T^6$. At this time the segmental gear wheel $C^3$ leaves the bevel gear wheel D and the rotation of the shaft E in the direction of the arrow $c'$ ceases. A reverse movement of the shaft E and the cones $E'$ and $E^2$ now takes place by the uncoiling of the spring $O^5$. As the cones reverse the lever $T^6$ engages the arm $g'$ and forces the band J open. When the shaft E reverses, the catch or projection O⁴ on the disk O strikes the lever O², so that further revolving of the shaft in the inverse direction of the arrow $c'$ is prevented. The cones are then stopped and are held stationary for the time being, so that the knot can be formed by the knotting devices L and L' on the ends of the spring coiled on the cones. At this time the gear wheel P' is thrown in mesh with the segmental gear wheel on the cam wheel C, so that the shafts P⁵ and P⁸ are rotated in the direction of the arrow $d'$, see Fig. 13. The two knotting devices L and L' operate simultaneously to form the knot, the knotting device L' first cutting off the wire as previously described. The slides T³ move downward at the same time the cam wheel Q moves the cutter onto the wire. Then the cam forces the slide S down just far enough to cut the wire. Then the cam wheel Q pushes the lever farther forward and crosses the wires as shown in Fig. 10. Then the slide S is forced to its lowermost position, the point S⁹ on the slide now passing between the loose end of the wire and the first coil, at the same time bending the end of the wire downward, so that it passes into the groove V⁴ in the knotter gear wheel V behind the plate V⁵. The first coil of the wire remains in the central aperture V² of the wheel V. The segmental gear wheels V' now mesh into the turning gear wheels V, so that the ends of the wire in the grooves V⁴ are carried around the end coils, the said gear wheel revolving twice and thus forming the knot. It is understood that the plate V⁵ prevents the free end of the wire from springing into the slot S⁸ of the slide as soon as the knotter wheel V commences to revolve. This would block the wheel V; hence the plate V⁵ is absolutely necessary. As soon as the knot is tied at each end of the spring, the cam wheel Q disengages the slide S, so that the latter can return to its former position, as previously described. The upward movement of the slides S and T³ disengages the arms J' of the spring bands J and J⁷, so that the two close simultaneously, thereby leaving the finished spring loose on the cones. The projection O⁸ on the cam wheel C now moves the lever O² from the stop O⁴ on the disk O, so that the latter reverses or turns in the inverse direction of the arrow $c'$ until the catch O' again engages the lever O² and the cones E' and E² are moved into their former, original position. The pin C⁶ on the cam wheel C now strikes the arm G⁷ on the gear wheel G⁶, so that the latter is moved in engagement with the segmental gear wheel on the cam wheel C, whereby the said gear wheel G⁶ is rotated and a sliding motion is imparted to the slide G' by the cam wheel G⁴ acting on the friction roller G² of the said slide G'. The arm G of the latter now moves outward to the left and the two cones E' and E² are separated, in the manner previously described. When the two cones separate, the notch in the flange of the cone E² travels on an arm K¹⁴ projecting to the left from the frame L², see Fig. 1. The arm K¹⁴, by the movement of the cone E² to the left, engages the lever K and swings it into its normal position, so that its arm K' engages the arm J' of the spring band J and locks the latter in position to again receive the end of the wire fed through the feeding device H, for the purpose of forming the next spring. The arm W drops between two adjacent coils near the middle of the finished spring at the time the cones E² and E' move apart, so as to prevent the finished spring from clinging to the cones and at the same time guide the spring into the box X. As the cones E' and E² separate, the pawl G⁹ engages the lug Y³, and when the cones close or move toward each other the mechanism for compressing the spring in the box X is actuated in the manner previously described. When the spring has been compressed by the plungers Y and Y' and reacted thereon as previously described to aid the return movement of the plungers, and the latter have moved back to their outermost position and a new spring is being formed on the cones E² and E', then the box X is turned to one side so as to dump the spring, this movement of the box being accomplished from the slide I⁴ at the time the wire is fed through the feeding device. When the spring is compressed, the core Z prevents the spring from flying out of the box.

Having thus described my invention, I claim as new and desire to secure by Letters Patent—

1. In a machine of the class described, a spring band on the base end of the spring-forming cone and adapted to receive the end coil of the spring, substantially as shown and described.

2. In a machine of the class described, a spring-band on the base end of the spring-forming cone and adapted to receive the end coil of the spring, and means for opening the said spring band to take up the recoil of the formed spring, substantially as shown and described.

3. In a machine of the class described, the combination with a spring-forming cone, of a spring band secured at the base end of the said cone and coiled around it, substantially as shown and described.

4. In a machine of the class described, the combination with a spring-forming cone, of a spring band secured at the base end of the said cone and coiled around it, and means, substantially as described, for opening the said band to take up the recoil of the formed spring, as set forth.

5. In a machine of the class described, the combination with a spring-forming cone, of a spring band secured at the base end of the said cone and coiled around it, and means, substantially as described, for opening the said band to take up the recoil of the formed spring, the spring band being formed with a spiral groove to receive the wire for forming the base end of the spring, as set forth.

6. In a machine of the class described, the combination with a spring-forming cone, of a spring band secured at the base end of the said cone and coiled around it, means, substantially as described, for opening the said band to take up the recoil of the formed spring, and a lock adapted to engage the free end of the said spring band to hold it in an open position, as set forth.

7. In a machine of the class described, a spring band secured at one end to the base of the spring-forming cone and encircling the same, and an arm formed on the free end of the band and projecting over the fastened end to clamp the wire, substantially as shown and described.

8. In a machine of the class described, a spring band secured at one end to the base of the spring-forming cone and encircling the same, an arm formed on the free end of the band and projecting over the fastened end to clamp the wire, and a lever for holding the said spring shut to securely clamp the wire between the arm and fastened end of the band, substantially as shown and described.

9. In a machine of the class described, the combination with a spring-forming cone, of a spring band secured at one end to the base of the said cone and encircling it, an arm formed on the free end of the band and projecting over the fastened end to clamp the wire previous to coiling it on the said cone, and a spiral groove formed in the said band and continuing into the spiral groove on the cone, substantially as shown and described.

10. In a machine of the class described, the combination with a spring-forming cone, of a spring band secured at one end to the base of the said cone and encircling it, an arm formed on the free end of the band and projecting over the fastened end to clamp the wire previous to coiling it on the said cone, a lever for holding the said spring shut to securely clamp the wire between the arm and the fastened end of the band, and a locking bolt adapted to engage the said lever to lock the same in position to hold the spring shut, substantially as shown and described.

11. In a machine of the class described, the combination with a spring-forming cone, of a spring band secured at one end to the base of the said cone and encircling it, an arm formed on the free end of the band and projecting over the fastened end to clamp the wire previous to coiling it on the said cone, and a spring-pressed bolt fitted to slide in the said cone and adapted to engage the free end of the said spring band to lock the latter in an open position, substantially as shown and described.

12. In a machine of the class described, the combination with a spring-forming cone, of a spring band secured at one end to the base of the said cone and encircling it, an arm formed on the free end of the band and projecting over the fastened end to clamp the wire previous to coiling it on the said cone, a spring-pressed bolt fitted to slide in the said cone and adapted to engage the free end of the said spring band to lock the latter in an open position, and mechanism for pressing the said bolt inward to disengage it from the free end of the spring, substantially as shown and described.

13. In a machine of the class described, the combination with a spring-forming cone, of a spring band secured at one end to the base of the said cone and encircling the same, an arm formed on the free end of the said band, and a pivoted arm formed with a lug adapted to swing in the path of the arm on the spring band so that when the cone revolves the spring band is opened, substantially as shown and described.

14. In a machine of the class described, the combination with a spring-forming cone, of a spring band secured at one end to the base of the said cone and encircling the same, an arm formed on the free end of the said band, a pivoted arm formed with a lug adapted to swing in the path of the arm on the spring band so that when the cone revolves the spring band is opened, and a spring-pressed bolt held on the said cone and adapted to engage the free end of the said spring band when opened by the said lug, substantially as shown and described.

15. In a machine of the class described, the combination with an obliquely arranged guide, of a feed carriage for the wire and fitted to slide on the said guide, a disk mounted to turn on the said carriage and through which passes the wire, and a pawl pivoted on the said disk and resting, with its free end, on the wire to prevent an outward movement of the same, substantially as shown and described.

16. In a machine of the class described, the combination with a guide arranged obliquely to the cones and inclined, of a feed carriage for the wire and fitted to slide on the said guide, a disk mounted to turn on the said carriage and through which passes the wire, and means, substantially as described, for imparting motion to the said carriage, as set forth.

17. In a machine of the class described, the combination with a revolving cam wheel, of a slide carrying a friction roller engaging the cam groove in the said cam wheel, a feed carriage connected with the said slide, a guide arranged obliquely to the cones and carrying the said feed carriage, and an arm connecting the said slide with the said feed carriage, substantially as shown and described.

18. In a machine of the class described, the combination with two spring-forming cones abutting at their small ends, of a feed carriage for feeding the wire to the said cones, the feed carriage traveling obliquely to conform to the sides of the said cones, substantially as shown and described.

19. In a machine of the class described, the combination with the spring-forming cone, of a spring band J secured to and encircling the cone and provided with a projection J' on its free end, a spring bolt $K^2$ arranged radially in the cone, the pivoted arm $K^5$, the adjacent lugs, the pivoted lever $K^9$, and means for rotating the cone and cooperating with the other parts to form a coil and knot, as shown and described.

20. In a machine of the class described, the combination with a spring-forming cone formed at its base end with a recess, of a knotting device adapted to pass into the said recess, substantially as shown and described.

21. In a machine of the class described, the combination with a spring-forming cone formed at its base end with a recess, of a slide fitted to slide vertically and adapted to pass in the said recess, the said slide being formed with a transversely extending notch for the passage of the ends of the wire coiled on the said cone, and a knotting wheel mounted to revolve in the said slide and carrying the free end of the wire around the first coil, substantially as shown and described.

22. In a machine of the class described, the combination with a slide having a vertical sliding motion and formed with a transversely extending slot in its lower end, of a knotting wheel mounted to revolve in the said slide and formed with a transverse slot adapted to register with the slot in the said slide, substantially as shown and described.

23. In a machine of the class described, the combination with a slide having a vertical sliding motion and formed with a transversely extending slot in its lower end, of a knotting wheel mounted to revolve in the said slide and formed with a transverse slot adapted to register with the slot in the said slide, the hub of the said wheel being formed with a central opening leading to the said slot, substantially as shown and described.

24. In a machine of the class described, the combination with a slide having a vertical sliding motion and formed with a transversely extending slot in its lower end, of a knotting wheel mounted to revolve in the said slide and formed with a transverse slot adapted to register with the slot in the said slide, the hub of the said wheel being formed with a central opening leading to the said slot, and a segmental gear wheel adapted to engage the said knotting gear wheel to turn the same in the said slot to carry the free end of the wire around the first coil, substantially as shown and described.

25. In a machine of the class described, the combination with a slide having a vertical sliding motion and formed with a transversely extending slot in its lower end, of a knotting wheel mounted to revolve in the said slide and formed with a transverse slot adapted to register with the slot in the said slide, the hub of the said wheel being formed with a central opening leading to the said slot, and means, substantially as described, for imparting a vertical sliding motion to the said slide, as set forth.

26. In a machine of the class described, the combination with a spring-forming cone, formed at its base end with a recess, of a slide mounted to slide vertically and provided with a clamping plate having two recesses engaging the ends of the wire to hold the same in place at the base end of the cone, substantially as shown and described.

27. In a machine of the class described, the combination of the pivoted swinging lever, and the knife $R^4$ fixed on its free end, the knife $R^3$ pivoted to the lever adjacent to such fixed knife, springs for retracting both knives, and the wheel Q having a cam which acts on the lever, all cooperating as shown and described.

28. In a machine of the class described, the combination with a spring-forming cone formed with a recess at its base end, of a slide mounted to slide vertically and formed with a transverse slot, and a point projecting from the lower end of the said slide to engage the end of the crossed wire to pass the latter into the said slot, substantially as shown and described.

29. In a machine of the class described, the combination with a spring-forming cone formed with a recess at its base end, of a slide mounted to slide vertically and formed with a transverse slot, a point projecting from the lower end of the slide to engage the end of the crossed wire to pass the latter into the said slot, and a knotting gear wheel mounted to turn in the said slide and having a transverse slot registering with the slot in the slide and adapted to receive the end of the wire, substantially as shown and described.

30. In a machine of the class described, the combination with two spring-forming cones abutting at their small ends and mounted to slide from each other, of an arm mounted to swing and adapted to pass between two adjacent coils of the spring held on the said cones, previous to their opening movement, substantially as shown and described.

31. In a machine of the class described, the combination with the shafts carrying the cones and mounted to revolve, of a disk held on the said shaft, a spring connected with the said disk at one end and having its free end extending transversely, and a lever mounted to swing and adapted to be passed into the path of the free end of the said spring, substantially as shown and described.

32. In a machine of the class described, the combination with the shafts carrying the cones and mounted to revolve, of a disk held on the said shaft, a spring connected with the said disk at one end and having its free end extending transversely, a lever mounted to swing and adapted to be passed into the path of the free end of the said spring, and a cam wheel provided with a cam projection to actuate the said lever to move it into the path of the free end of the said spring or to disengage it from the said free end, substantially as shown and described.

33. In a machine of the class described, the combination with the shafts carrying the cones and mounted to revolve, of a disk held on the said shaft, a spring connected with the said disk at one end and having its free end extending transversely, a lever mounted to swing and adapted to be passed into the path of the free end of the said spring, and a spring-pressed lever adapted to engage a lug or stop on the said disk to lock the latter in position, substantially as shown and described.

34. In a machine of the class described, the combination with two slides connected with each other by a cord and adapted to move simultaneously in opposite directions, means for imparting a sliding motion, in one direction, to one of the said slides, plungers carried by the said slides, and a spring-receiving box adapted to receive the said plungers, substantially as shown and described.

35. In a machine of the class described, the combination with two slides connected with each other by a cord and adapted to move simultaneously in opposite directions, means for imparting a sliding motion, in one direction, to one of the said slides, plungers carried by the said slides, a spring-receiving box adapted to receive the said plungers, and a weight for imparting a return movement to the said slides, substantially as shown and described.

36. In a machine of the class described, the combination with two slides connected with each other by a cord and adapted to move simultaneously in opposite directions, means for imparting a sliding motion, in one direction, to one of the said slides, plungers carried by the said slides, a spring-receiving box adapted to receive the said plungers, a spring-pressed core fitted to slide in one of the said slides and adapted to pass into the said spring receiving box and into the central opening of the spring, previous to the compressing of the latter by the said plungers, substantially as shown and described.

37. In a machine of the class described, the combination with two slides connected with each other by a cord and adapted to move simultaneously in opposite directions, means for imparting a sliding motion, in one direction, to one of the said slides, plungers carried by the said slides, a spring receiving box adapted to receive the said plungers, a spring-pressed core fitted to slide in one of the said slides and adapted to pass into the said spring receiving box and into the central opening of the spring, previous to the compressing of the latter by the said plungers, and a retaining and releasing mechanism for the said core, substantially as shown and described.

WILLIAM B. JACKSON.

Witnesses:
R. G. COMBS,
J. V. W. MONTAGUE.